United States Patent
Wu et al.

(10) Patent No.: US 9,860,523 B2
(45) Date of Patent: Jan. 2, 2018

(54) SLIT GRATING STRUCTURE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hailong Wu, Beijing (CN); Juan Yu, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 438 days.

(21) Appl. No.: 14/404,044

(22) PCT Filed: Mar. 25, 2014

(86) PCT No.: PCT/CN2014/074025
§ 371 (c)(1),
(2) Date: Nov. 26, 2014

(87) PCT Pub. No.: WO2015/043144
PCT Pub. Date: Apr. 2, 2015

(65) Prior Publication Data
US 2016/0345002 A1    Nov. 24, 2016

(30) Foreign Application Priority Data

Sep. 29, 2013  (CN) .......................... 2013 1 0456019

(51) Int. Cl.
*H04N 7/18*     (2006.01)
*H04N 13/04*    (2006.01)
(Continued)

(52) U.S. Cl.
CPC ....... *H04N 13/0454* (2013.01); *G02B 26/004* (2013.01); *G02B 27/2214* (2013.01);
(Continued)

(58) Field of Classification Search
CPC ........ G02B 27/22; G02B 27/26; H04N 13/00; H04N 13/04
(Continued)

(56) References Cited

U.S. PATENT DOCUMENTS 8,896,919 B2 * 11/2014 Song .................. G02B 27/2214
                                                      348/59
2010/0002175 A1  1/2010 Kim et al.
2010/0091227 A1  4/2010 Chen et al.

FOREIGN PATENT DOCUMENTS

CN      2129936 Y    4/1993
CN      1298108 A    6/2001
(Continued)

OTHER PUBLICATIONS

Chinese Office Action issued in corresponding Chinese Application No. 201310456019.2.
(Continued)

*Primary Examiner* — Andy Rao
(74) *Attorney, Agent, or Firm* — Nath, Goldberg & Meyer; Joshua B. Goldberg

(57) ABSTRACT

The present invention provides a slit grating structure and a display device, and relates to the field of stereo display technology. The slit grating structure of the present invention comprises a plurality of alternately arranged transparent strips and switching strips, and a drawing and injecting unit, wherein the drawing and injecting unit is configured to inject non-transparent liquid into the switching strips from a cavity and draw non-transparent liquid out of the switching strips.

(Continued)

When the slit grating structure cooperates with a 2D display panel, 2D and 3D switching display can be achieved.

20 Claims, 1 Drawing Sheet

(51) Int. Cl.
 *G02B 26/00* (2006.01)
 *G02B 27/22* (2006.01)
 *G02F 1/1335* (2006.01)
(52) U.S. Cl.
 CPC ... *G02F 1/133512* (2013.01); *H04N 13/0409* (2013.01); *H04N 2213/001* (2013.01)
(58) Field of Classification Search
 USPC ..................................................... 348/51–60
 See application file for complete search history.

(56) References Cited

FOREIGN PATENT DOCUMENTS

| | | |
|---|---|---|
| CN | 1568624 A | 1/2005 |
| CN | 202057899 U | 11/2011 |
| CN | 102540616 A | 7/2012 |
| CN | 102830526 A | 12/2012 |
| CN | 102879946 A | 1/2013 |
| CN | 202837759 U | 3/2013 |
| CN | 103116239 A | 5/2013 |
| CN | 103217832 A | 7/2013 |
| CN | 103499850 A | 1/2014 |
| CN | 203519860 U | 4/2014 |
| JP | 2003089896 A | 3/2003 |
| KR | 20010001456 A | 1/2001 |

OTHER PUBLICATIONS

Search Report issued in International Application No. PCT/CN2014/074025, fourteen (14) pages.

Notification of the First Office Action dated Jun. 30, 2015 corresponding to Chinese application No. 201310372886.8.

Written Opinion of the International Searching Authority dated Jun. 9, 2014 corresponding to International application No. PCT/CN2013/089798.

* cited by examiner

SLIT GRATING STRUCTURE AND DISPLAY DEVICE

This is a National Phase Application filed under 35 U.S.C. 371 as a national stage of PCT/CN2014/074025, filed Mar. 25, 2014, and claims priority benefit from Chinese Application No. 201310456019.2, filed Sep. 29, 2013, the content of each of which is hereby incorporated by reference in its entirety.

FIELD OF THE INVENTION

The present invention relates to the field of stereo display technology, and particularly relates to a slit grating structure and a display device.

BACKGROUND OF THE INVENTION

At present, autostereoscopic 3D display is generally realized by providing a slit grating on a light outgoing surface of a 2D display panel. The slit grating separates the light going to left and right eyes through light blocking strips and transparent strips, thus to realize autostereoscopic 3D display. However, some film resources or texts need to be watched in a 2D condition. Therefore, the capability of switching between 3D display and 2D display is needed.

As shown in FIG. 1, an existing method of switching between 3D display and 2D display typically injects liquid crystals into switching strips 2 (light blocking strips) of a slit grating, and forms indium tin oxide (ITO) transparent electrodes on both upper and lower surfaces (light outgoing surface and light incident surface) of the slit grating. The deflecting directions of the liquid crystals in the switching strips 2 are controlled by applying voltage to the transparent electrodes on both upper and lower surfaces of the slit grating. When the transparent electrodes on both upper and lower surfaces of the slit grating are applied with certain voltage, the liquid crystals in the switching strips 2 of the slit grating rotate, which makes the polarized light that passes through the slit grating rotate 90 degrees (wherein the upper and lower surfaces of the slit grating are provided with an upper polaroid and a lower polaroid parallel to the vibration direction, respectively), so that the polarized light cannot pass through the slit grating, and 3D picture display is implemented. When the transparent electrodes on both upper and lower surfaces of the slit grating are not applied with voltage, the liquid crystals in the switching strips 2 of the slit grating do not rotate, so that the polarized light can passes through the slit grating, and 2D picture display is implemented. That is to say, when the light can pass through the switching strips 2, the 2D display function is realized, and when the light cannot pass through the switching strips 2, 3D display function is realized.

The inventor finds that at least the following problems exist in the prior art: if the display panel is a liquid crystal display panel, the indium tin oxide transparent electrodes on both upper and lower surfaces of the slit grating will form a bypass electric field after they are applied with voltage, which may affect rotation of the liquid crystals in the display panel and further affect display quality of the display panel.

SUMMARY OF THE INVENTION

In view of the above problems existing in the prior art, the present invention proposed a slit grating structure and a display device which can realize 2D/3D display switching without affecting display effect of the display panel, so as to overcome the shortcomings in the prior art solutions.

The technical solution adopted by the present invention to solve above technical problems is a slit grating structure, which comprises: a plurality of alternately arranged transparent strips and switching strips, and a drawing and injecting unit, wherein the drawing and injecting unit is configured to inject non-transparent liquid into the switching strips and draw non-transparent liquid out of the switching strips.

The slit grating structure in the embodiment of the present invention has a drawing and injecting unit, which can inject non-transparent liquid into the switching strips so as to realize 3D display, and draw non-transparent liquid out of the switching strips so as to realize 2D display.

Preferably, the drawing and injecting unit comprises a cavity and a flow tube, wherein the cavity is used for accommodating the non-transparent liquid and communicates with the switching strips through the flow tube.

More preferably, the cavity communicates with ends of the switching strips at a same side through one flow tube.

Preferably, the drawing and injecting unit further comprises an execution module for injecting the non-transparent liquid into the switching strips from the cavity and drawing the non-transparent liquid into the cavity from the switching strips.

More preferably, the execution module comprises a motor and a piston, wherein the piston is located in the cavity, and the motor is used for controlling movement of the piston in the cavity; when the motor controls the piston to move towards the flow tube, the non-transparent liquid is injected into the switching strips from the cavity; and when the motor controls the piston to move away from the flow tube, the non-transparent liquid is drawn into the cavity from the switching strips.

Preferably, the drawing and injecting unit further comprises a receiver module connected with the execution module, and the receiver module is configured to receive a 2D/3D display type indication signal and control the execution module according to the 2D/3D display type indication signal.

More preferably, the drawing and injecting unit further comprises a control module connected with the execution module and the receiver module respectively, wherein the receiver module transfers the received 2D/3D display type indication signal to the control module, and the control module drives the execution module to operate according to the 2D/3D display type indication signal, controls the execution module to draw the non-transparent liquid into the cavity from the switching strips when a 2D display type indication signal is received, and controls the execution module to inject the non-transparent liquid into the switching strips from the cavity when a 3D display type indication signal is received.

More preferably, the receiver module is selected from the group comprising: electrical signal receiver module, infrared receiver module, radio receiver module and voice control receiver module.

Preferably, the non-transparent liquid is pure black ink.

Preferably, the slit grating structure is configured for switching a display panel between 2D display mode and 3D display mode, and the transparent strips and switching strips correspond to specified pixel columns of the display panel, respectively.

The technical solution adopted by the present invention for solving the technical problems is a display device which comprises the slit grating structure and the display pane as described above, and the slit grating structure is arranged on the side of the light outgoing surface of the display panel.

By means of the display device of the present invention comprising the above slit grating structure, a 2D/3D switching display is realized.

Preferably, the display device further comprises a transmitter module connected with the display panel, wherein the display panel is configured to output a 2D/3D display type indication signal, and the transmitter module is configured to transmit the 2D/3D display type indication signal output by the display panel to the receiver module.

Figure 1:
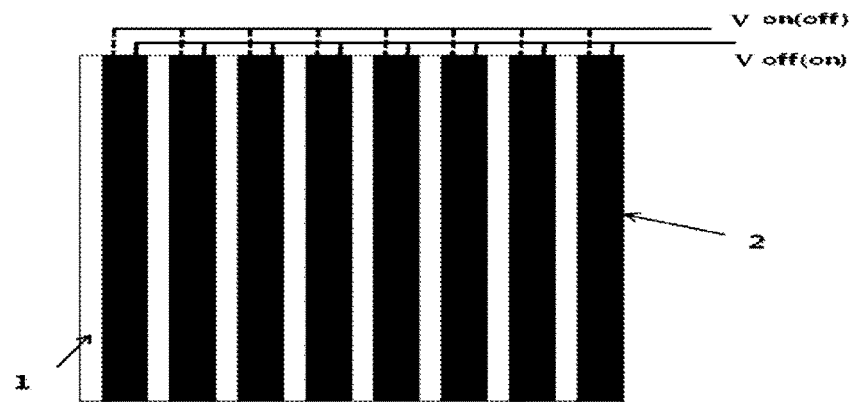
FIG. 1 is a schematic diagram of an existing slit grating structure.

REFERENCE NUMERALS 1. transparent strip; 2. switching strip; 3. cavity; 4. flow tube; 5. piston; 6. motor; 7. receiver module; 8. control module.

DETAILED DESCRIPTION OF THE EMBODIMENTS

To make the person skilled in the art better understand the technical solution of the present invention, the present invention is further described below in details in conjunction with the accompanying drawings and the specific embodiments.

Embodiment 1

Figure 2:
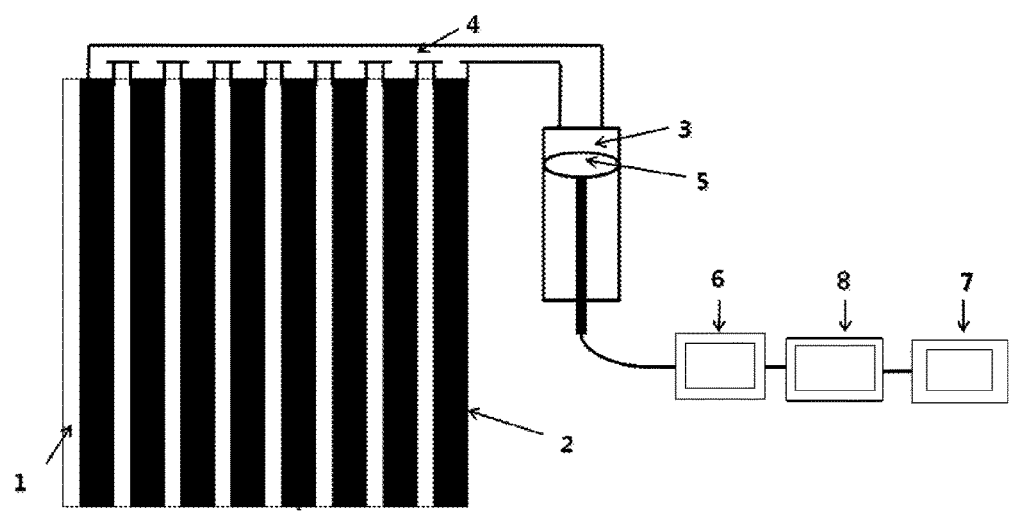
FIG. 2 is a schematic diagram of a slit grating structure according to embodiment 1 of the present invention.

As shown in FIG. 2, the present embodiment provides a slit grating structure, which comprises a plurality of alternately arranged transparent strips 1 and switching strips 2, and a drawing and injecting unit, wherein the drawing and injecting unit is configured to inject non-transparent liquid into the switching strips 2 and draw the non-transparent liquid out of the switching strips 2.

When the drawing and injecting unit has not injected the non-transparent liquid into the switching strips 2 or has drawn the non-transparent liquid out of the switching strips 2, the switching strips 2 of the slit grating structure can be transmissive. At this moment, the slit grating structure has no light splitting function and cooperates with a 2D display panel to realize 2D display. When the drawing and injecting unit has injected the non-transparent liquid into the switching strips 2, the switching strips 2 of the slit grating structure become light blocking strips which are not transmissive. At this moment, when light reaches the slit grating structure, the slit grating structure has light splitting function and cooperates with the 2D display panel to realize 3D display. If it is desired to switch from 3D display to 2D display, the non-transparent liquid can be drawn out of the switching strips 2.

The slit grating structure provided by the present embodiment has a simple structure and its function is easy to achieve.

In this case, preferably, the non-transparent liquid can be pure black ink formed by carbon black as main raw material, with some white shellac, oxalic acid, iron tannate and iron gallate added thereto.

In this case, preferably, the drawing and injecting unit comprises a cavity 3 and a flow tube 4, wherein the cavity 3 is used for accommodating the non-transparent liquid; of course, any external container not included in the slit grating structure can also be used to replace the cavity 3, namely the drawing and injecting unit may not contain the cavity 3. In this case, the cavity 3 communicates with the switching strips 2 by a flow, so that the non-transparent liquid can be injected into the switching strips 2 from the cavity 3 by the flow tube 4, and the non-transparent liquid can be drawn into the cavity 3 from the switching strips 2 by the flow tube 4. More preferably, the cavity 3 communicates with the same ends of the switching strips 2 by one flow tube 4, so the structure is simple. For example, the flow tube 4 adopts a hollow comb structure including one end and multiple teeth, the end communicates with the cavity 3, and the multiple teeth communicates with the same ends of the switching strips 2 respectively. Of course, multiple flow tubes 4 may also be used, and the cavity 3 communicates with the switching strips 2 respectively through the multiple flow tubes 4, but the structure is complex.

In this case, preferably, the drawing and injecting unit further comprises an execution module, which is used for injecting the non-transparent liquid into the switching strips 2 from the cavity 3 and drawing the non-transparent liquid into the cavity 3 from the switching strips 2. The execution module comprises a motor 6 and a piston 5, wherein the piston 5 is located in the cavity, and the motor 6 is used for controlling movement of the piston in the cavity 3 towards or away from the flow tube 4. When the piston 5 moves towards the flow tube 4, it provides thrust for the non-transparent liquid, so as to inject the non-transparent liquid into the switching strips 2; and when the piston 5 moves away from the flow tube 4, it provides suction for the non-transparent liquid, so as to draw the non-transparent liquid out of the switching strips 2.

In this case, preferably, the drawing and injecting unit further comprises a receiver module 7, which is connected with the execution module and configured to receive a 2D/3D display type indication signal (the signal can be from a display device or a control signal sent by a user). When the receiver module 7 receives a 2D display type indication signal, the execution module operates to draw the non-transparent liquid into the cavity 3 from the switching strips 2 (the execution module does not work if the non-transparent liquid is already in the cavity 3); when the receiver module 7 receives a 3D display type indication signal, the execution module operates to inject the non-transparent liquid into the switching strips 2 from the cavity 3 (the execution module does not work if the non-transparent liquid is already in the switching strips 2). More preferably, the receiver module 7 is selected from the group comprising: electrical signal receiver module, infrared receiver module, radio receiver module and voice control receiver module, or may be a module for receiving other signal.

Of course, the above drawing and injecting unit can further comprise a control module 8 connected with the execution module and the receiver module 7, respectively. When the receiver module 7 receives a 2D/3D display type indication signal, it transfers the signal to the control module 8. The control module 8 drives the execution module to operate according to the received 2D/3D display type indication signal, and controls the execution module to draw the non-transparent liquid into the cavity from the switching strips when a 2D display type indication signal is received, or controls the execution module to inject the non-transparent liquid into the switching strips from the cavity when a 3D display type indication signal is received, thus to realize display of 2D or 3D pictures when the slit grating structure cooperates with the 2D display panel.

In this case, preferably, the slit grating structure is configured for switching the display panel between a 2D display mode and a 3D display mode, and the transparent strips 1 and the switching strips 2 correspond to specified pixel columns of the display panel, respectively. By means of the slit grating structure in the display device, not only clear 3D pictures but also clear 2D pictures can be displayed.

Embodiment 2

The embodiment provides a display device which comprises the slit grating structure of embodiment 1, and a display panel, wherein the slit grating structure is arranged on the side of light outgoing surface of the display panel.

Preferably, the display device further comprises a transmitter module connected with the display panel, wherein the display panel is configured to output a 2D/3D display type indication signal, and the transmitter module is configured to transmit the 2D/3D display type indication signal output by the display panel to the receiver module 7 of the slit grating structure, to realize injection of the non-transparent liquid into the switching strips 2 from the cavity 3 and drawing of the non-transparent liquid into the cavity 3 from the switching strips 2, and to further realize 2D and 3D display switching function.

The display device can be any product or component with display function such as OLED panel, mobile phone, tablet computer, television, monitor, laptop computer, digital photo frame, navigator, etc.

The display device in the present embodiment comprises the slit grating structure of embodiment 1, and therefore it can realize 2D/3D switching display.

Of course, the display device of the present embodiment can also comprises other conventional structure, such as power unit, display drive unit, etc.

It should be understood that the above embodiments are only exemplary embodiments for illustrating the principle of the present invention; however, the present invention is not limited thereto. Various variations and improvements can be made by the person skilled in the art without departing from the spirit and essence of the present invention, and these variations and improvements should also be considered to be within the protection scope of the present invention.

The invention claimed is:

1. A slit grating structure, comprising: a plurality of alternately arranged transparent strips and switching strips, further comprising a drawing and injecting unit configured to inject non-transparent liquid into the switching strips and draw non-transparent liquid out of the switching strips.

2. The slit grating structure according to claim 1, wherein the drawing and injecting unit comprises a cavity and a flow tube, and the cavity is used for accommodating the non-transparent liquid and communicates with the switching strips through the flow tube.

3. The slit grating structure according to claim 2, wherein the cavity communicates with ends of the switching strips at a same side through one flow tube.

4. The slit grating structure according to claim 2, wherein the drawing and injecting unit further comprises an execution module for injecting the non-transparent liquid into the switching strips from the cavity and drawing the non-transparent liquid into the cavity from the switching strips.

5. The slit grating structure according to claim 4, wherein the execution module comprises a motor and a piston, wherein
the piston is located in the cavity, and the motor is used for controlling movement of the piston in the cavity; when the motor controls the piston to move towards the flow tube, the non-transparent liquid is injected into the switching strips from the cavity; and when the motor controls the piston to move away from the flow tube, the non-transparent liquid is drawn into the cavity from the switching strip.

6. The slit grating structure according to claim 4, wherein the drawing and injecting unit further comprises a receiver module connected with the execution module, and
the receiver module is configured to receive a 2D/3D display type indication signal and control the execution module according to the 2D/3D display type indication signal.

7. The slit grating structure according to claim 6, wherein the drawing and injecting unit further comprises a control module connected with the execution module and the receiver module respectively, wherein
the receiver module transfers the received 2D/3D display type indication signal to the control module, and
the control module drives the execution module to operate according to the 2D/3D display type indication signal, controls the execution module to draw the non-transparent liquid into the cavity from the switching strips when a 2D display type indication signal is received, and controls the execution module to inject the non-transparent liquid into the switching strips from the cavity when a 3D display type indication signal is received.

8. The slit grating structure according to claim 6, wherein the receiver module is selected from the group comprising: electrical signal receiver module, infrared receiver module, radio receiver module and voice control receiver module.

9. The slit grating structure according to claim 1, wherein the non-transparent liquid is pure black ink.

10. The slit grating structure according to claim 1, wherein the slit grating structure is configured for switching a display panel between a 2D display mode and a 3D display mode, and the transparent strips and the switching strips correspond to specified pixel columns of the display panel, respectively.

11. A display device, comprising a slit grating structure and a display panel, wherein the slit grating structure comprises a plurality of alternately arranged transparent strips and switching strips, and a drawing and injecting unit configured to inject non-transparent liquid into the switching strips and draw non-transparent liquid out of the switching strips, and the slit grating structure is arranged on the side of the light outgoing surface of the display panel.

12. The display device according to claim 11, wherein the drawing and injecting unit comprises a cavity and a flow tube, and the cavity is used for accommodating the non-transparent liquid and communicates with the switching strips through the flow tube.

13. The display device according to claim 12, wherein the cavity communicates with ends of the switching strips at a same side through one flow tube.

14. The display device according to claim 12, wherein the drawing and injecting unit further comprises an execution module for injecting the non-transparent liquid into the switching strips from the cavity and drawing the non-transparent liquid into the cavity from the switching strips.

15. The display device according to claim 14, wherein the execution module comprises a motor and a piston, wherein
the piston is located in the cavity, and the motor is used for controlling movement of the piston in the cavity; when the motor controls the piston to move towards the flow tube, the non-transparent liquid is injected into the switching strips from the cavity; and when the motor controls the piston to move away from the flow tube, the non-transparent liquid is drawn into the cavity from the switching strip.

16. The display device according to claim 14, wherein the drawing and injecting unit further comprises a receiver module connected with the execution module, and
the receiver module is configured to receive a 2D/3D display type indication signal and control the execution module according to the 2D/3D display type indication signal.

17. The display device according to claim 16, wherein the drawing and injecting unit further comprises a control module connected with the execution module and the receiver module respectively, wherein
the receiver module transfers the received 2D/3D display type indication signal to the control module, and
the control module drives the execution module to operate according to the 2D/3D display type indication signal, controls the execution module to draw the non-transparent liquid into the cavity from the switching strips when a 2D display type indication signal is received, and controls the execution module to inject the non-transparent liquid into the switching strips from the cavity when a 3D display type indication signal is received.

18. The display device according to claim 16, wherein the receiver module is selected from the group comprising: electrical signal receiver module, infrared receiver module, radio receiver module and voice control receiver module.

19. The display device according to claim 11, wherein the slit grating structure is configured for switching a display panel between a 2D display mode and a 3D display mode, and the transparent strips and the switching strips correspond to specified pixel columns of the display panel, respectively.

20. The display device according to claim 16, wherein the display device further comprises a transmitter module connected with the display panel, wherein
the display panel is configured to output a 2D/3D display type indication signal, and
the transmitter module is configured to transmit the 2D/3D display type indication signal output by the display panel to the receiver module.

* * * * *